(12) United States Patent
Ziegler et al.

(10) Patent No.: US 9,817,373 B2
(45) Date of Patent: Nov. 14, 2017

(54) SYSTEM AND METHOD FOR COMMUNICATING DATA WITH A MOTOR CONTROLLER

(71) Applicant: Regal Beloit America, Inc., Beloit, WI (US)

(72) Inventors: William Arthur Ziegler, Jefferson City, MO (US); Katie D. Hamilton, Covington, OH (US); Paul Steven Mullin, Yellow Springs, OH (US); Jeffrey Jay Long, Purdy, MO (US); Michael David Smith, Rogers, AR (US)

(73) Assignee: Regal Beloit America, Inc., Beloit, WI (US)

( * ) Notice: Subject to any disclaimer, the term of this patent is extended or adjusted under 35 U.S.C. 154(b) by 375 days.

(21) Appl. No.: 14/595,523

(22) Filed: Jan. 13, 2015

(65) Prior Publication Data
US 2016/0204721 A1   Jul. 14, 2016

(51) Int. Cl.
*G05B 11/42* (2006.01)
*H02P 6/00* (2016.01)
*H02P 6/12* (2006.01)
*H02P 6/06* (2006.01)

(52) U.S. Cl.
CPC ............... *G05B 11/42* (2013.01); *H02P 6/06* (2013.01); *H02P 6/12* (2013.01)

(58) Field of Classification Search
CPC ............... G05B 11/42; H02P 6/06; H02P 6/12
See application file for complete search history.

(56) References Cited

U.S. PATENT DOCUMENTS

| | | | |
|---|---|---|---|
| 3,241,017 A | 3/1966 | Madsen et al. | |
| 3,990,014 A | 11/1976 | Hakozaki | |
| 4,506,201 A | 3/1985 | Tsuneki | |
| 4,510,266 A | 4/1985 | Eertink | |
| 5,552,689 A * | 9/1996 | Matoba | H02P 6/12 318/567 |
| 5,648,892 A | 7/1997 | Wieloch et al. | |
| 5,907,475 A | 5/1999 | Babinski et al. | |
| 6,380,757 B1 | 4/2002 | Draves et al. | |
| 6,671,459 B1 * | 12/2003 | Bultman | H02P 23/0077 318/432 |

(Continued)

*Primary Examiner* — Abdelmoniem Elamin
(74) *Attorney, Agent, or Firm* — Armstrong Teasdale LLP

(57) ABSTRACT

A motor controller configured to be coupled to a motor and to a system controller is described. The motor controller includes a proportional-integral (PI) regulator coupled to a timer controller. The motor controller is configured to generate, by the PI regulator, a pulsed signal representing a reported speed of the motor. Additionally, the motor controller is configured to transmit the pulsed signal to the system controller, measure a time period that elapses for the motor to make a predefined number of revolutions, measure a number of pulses transmitted in the pulsed signal, and determine a measured speed of the motor from the time period. Further, the motor controller is configured to determine, by the PI regulator, a difference between the reported speed and the measured speed, and adjust, by the PI regulator, the pulsed signal based on the difference between the reported speed and the measured speed.

20 Claims, 6 Drawing Sheets

(56) References Cited

U.S. PATENT DOCUMENTS

| | | | |
|---|---|---|---|
| 6,819,074 B2* | 11/2004 | Yoo | H02P 6/17 |
| | | | 318/461 |
| 6,936,989 B2 | 8/2005 | Hogan | |
| 7,262,523 B1* | 8/2007 | Faizullabhoy | G01D 5/34746 |
| | | | 310/12.19 |
| 8,639,417 B2* | 1/2014 | Illg | G05B 19/19 |
| | | | 318/599 |
| 8,853,984 B2 | 10/2014 | Yeh | |
| 9,088,227 B2* | 7/2015 | Murata | H02P 6/00 |
| 9,367,046 B2* | 6/2016 | Murata | H02P 6/00 |
| 2008/0112697 A1* | 5/2008 | Kim | G05B 19/416 |
| | | | 388/823 |
| 2009/0324205 A1 | 12/2009 | Lambrechts et al. | |
| 2012/0112524 A1* | 5/2012 | Shibata | B60T 13/146 |
| | | | 303/10 |
| 2014/0044466 A1* | 2/2014 | Murata | H02P 6/00 |
| | | | 399/367 |
| 2015/0234362 A1* | 8/2015 | Murata | G03G 15/6529 |
| | | | 399/381 |

\* cited by examiner

SYSTEM AND METHOD FOR COMMUNICATING DATA WITH A MOTOR CONTROLLER

BACKGROUND

The field of the disclosure relates generally to transmitting data to and from a motor controller, and more specifically to wirelessly transmitting configuration settings to a motor controller and transmitting report data from the motor controller to another device.

At least some known motor controllers store settings in memory for controlling operations of a motor. In some systems, the settings are configured at the time the motor controller is manufactured or when the motor controller is removed from an installation environment (i.e., a field location) for maintenance. In some known systems, the motor controller must be physically connected to an external computing device, such as a laptop computing device, that transmits the settings to the motor controller. Additionally, in some known systems, the motor controller must be physically coupled to a power source to store the settings in memory. Additionally, in some known systems, a motor controller transmits report data, such as a speed of a motor that the motor controller is coupled to, using a pulsed signal (e.g., a pulse train) that is received by another device, such as system controller. In conventional systems, the motor controller includes a relatively expensive computing device that performs processor-intensive operations, such as 32-bit multiplication and/or division, to generate a pulsed signal that represents a current speed of the motor.

BRIEF DESCRIPTION

In one aspect, a motor controller configured to be coupled to a motor and to a system controller is provided. The motor controller includes a proportional-integral (PI) regulator coupled to a timer controller. The motor controller is configured to generate, by the PI regulator, a pulsed signal representing a reported speed of the motor. Additionally, the motor controller is configured to transmit the pulsed signal to the system controller. Further, the motor controller is configured to measure a time period that elapses for the motor to make a predefined number of revolutions. Further, the motor controller is configured to measure a number of pulses transmitted in the pulsed signal. Additionally, the motor controller is configured to determine a measured speed of the motor from the time period. Further, the motor controller is configured to determine, by the PI regulator, a difference between the reported speed and the measured speed, and adjust, by the PI regulator, the pulsed signal based on the difference between the reported speed and the measured speed.

In another aspect, a method for reporting a speed of a motor is provided. The method is implemented by a motor controller coupled to a motor. The method includes generating, by a proportional-integral (PI) regulator included in the motor controller, a pulsed signal representing a reported speed of the motor. Additionally, the method includes transmitting the pulsed signal to a system controller. The method further includes measuring a time period that elapses for the motor to make a predefined number of revolutions. The method additionally includes measuring a number of pulses transmitted in the pulsed signal. The method also includes determining a measured speed of the motor from the time period. Additionally, the method includes determining, by the PI regulator, a difference between the reported speed and the measured speed. The method additionally includes adjusting, by the PI regulator, the pulsed signal based on the difference between the reported speed and the measured speed.

DETAILED DESCRIPTION

Rather than relying on a relatively expensive computing device used in conventional motor controllers to generate a pulsed signal representing the speed of the motor, the system described herein uses a PI regulator that iteratively adjusts a reported speed to match a measured speed of the motor. Additionally, the system described herein enables a motor controller to receive configuration settings transmitted to the motor controller in a wireless signal, for example through near field communication (NFC). Accordingly, the motor controller can be configured without requiring physical coupling of an external computing device to the motor controller when the motor controller is installed in a location that is difficult for a person, such as a technician, to physically access (e.g., within a housing inside a furnace). Additionally, implementations of the system described herein enable the motor controller to store the wirelessly transmitted settings using only the power in the received wireless signal. Accordingly, the motor controller can be configured while it is in a shipping container or otherwise not physically connected to a power source.

In one implementation, a computer program is described, and the program is embodied on a computer-readable medium. In an example implementation, the computer program is executed on a standalone computing device. The computer program is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
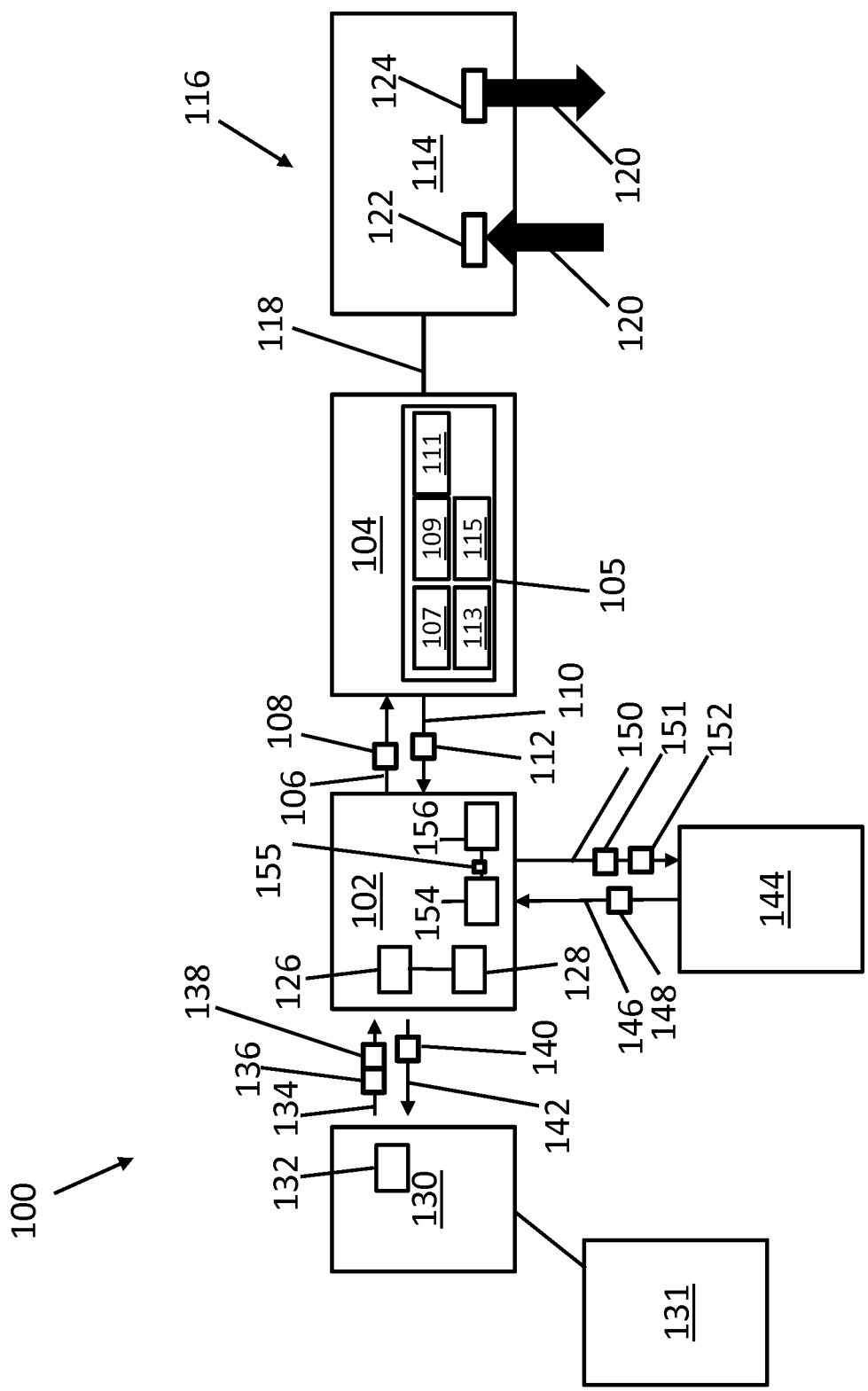
FIG. 1 is a block diagram of an example system that includes a motor controller coupled to a motor.

FIG. 1 is a block diagram of an example system 100 that includes a motor controller 102 coupled to a motor 104. Motor controller 102 transmits command signals 106 to motor 104, including commands 108 to control an operation of motor 104. Motor 104 includes a rotor (not shown) that rotates at a speed 105. Speed 105 is, for example, a time period 109 during which motor 104 performs a predefined number 113 of revolutions 107. Expressed in a different way, speed 105 is a number of revolutions 107 of motor 104 (i.e., of the rotor) within a predefined time period 115. In some implementations, motor 104 includes hall effect sensors (not shown) that detect cycles 111, such as changes in polarity, within motor 104. In some implementations, two cycles 111 detected by the hall sensors correspond to one revolution 107. Motor controller 102 receives feedback signals 110 from motor 104 representing feedback 112, such as an operational status of motor 104. In at least some implementations, feedback 112 includes speed 105 of motor 104. In some implementations, motor controller 102 is incorporated within motor 104. Motor 104 may be an electric motor and, in some implementations, is an electric variable speed motor, such as an electronically commutated motor (ECM). Motor 104 drives a load 114 such as a blower, in an installation environment 116. In some implementations, installation environment 116 is a furnace. Motor 104 is coupled to load 114 by a shaft 118. As motor 104 rotates shaft 118, a fluid 120 such as gas, and more specifically combustion gas, is received through an inlet 122 and forced out through an outlet 124.

In at least some implementations, motor controller 102 includes a wireless communication interface 126 that is coupled to a memory 128. In some implementations, wireless communication interface 126 is configured to receive and/or transmit signals using near field communication (NFC). More specifically, a transceiver device 130 that also includes a wireless communication interface 132 wirelessly transmits instruction signals 134 to wireless communication interface 126 in motor controller 102. In some implementations, transceiver device 130 is coupled to a programmer computing device 131 (e.g., a laptop computing device or tablet computing device) that instructs transceiver device 130 to transmit instruction signals 134 and/or to receive response signals 140. Instruction signals 134 include instructions 136, such as settings 300 (FIG. 3), as described in more detail herein. Additionally, instruction signals 134 include power 138. In at least some implementations, wireless communication interface 126 utilizes power 138 to perform an operation in response to receiving one or more instruction signals 134. For example, in some implementations, wireless communication interface 132 utilizes power 138 to store one or more settings 300 from instructions 136 without requiring power from any other power source. In some implementations, wireless communication interface 126 wirelessly transmits response signals 140 including response data 142 to programmer computing device 131. Response data 142 includes, for example, acknowledgements of instructions 136 and/or one or more settings 300 stored in memory 128.

In some implementations, a system controller 144, for example a furnace controller, transmits control signals 146, including control data 148 to motor controller 102. Additionally, motor controller 102 transmits report signals 150 including report data 152 to system controller 144. In some implementations, one or more of control signals 146 and report signals 150 are pulsed signals, in which one or more of control data 148 and report data 152 are represented by a number and/or duration of pulses 151. Each pulse 151 is a duration in which the pulsed signal (e.g., control signal 146 and/or report signal 150) is at a first of two different predefined voltages (e.g., a relatively high voltage, such as 5 volts, and a relatively low voltage, such as 0 volts). In some implementations, motor controller 102 includes a proportional-integral (PI) regulator 154 coupled to a timer controller 156. As described in more detail herein, PI regulator 154 transmits timing data 155 to timer controller 156 to transmit reporting signals 150 in which the number and/or duration of pulses in reporting signals 150 represent report data 152.

Figure 2:
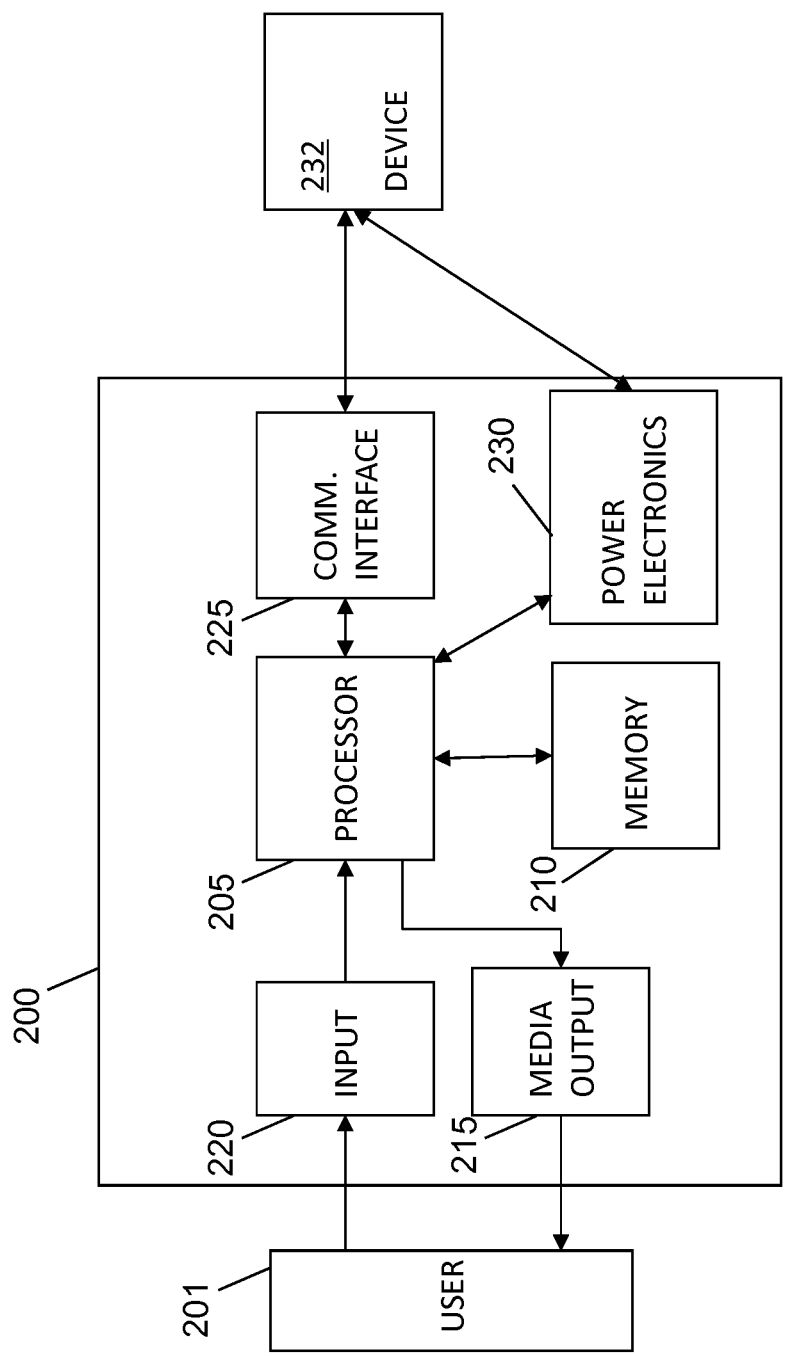
FIG. 2 is a block diagram of an example computing device included in the system of FIG. 1.

FIG. 2 is a block diagram of an example computing device 200. At least some components of computing device 200 are included in implementations of other devices describe herein, for example motor controller 102, transceiver device 130, programmer computing device 131, and system controller 144. Computing device 200 includes a processor 205 for executing instructions. In some implementations, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer-readable media.

In some implementations, computing device 200 also includes at least one media output component 215 for presenting information to user 201. Media output component 215 is any component capable of conveying information to user 201. In some implementations, media output component 215 includes an output adapter such as a video adapter and/or an audio adapter. An output adapter is operatively coupled to processor 205 and operatively couplable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones).

In some implementations, computing device 200 includes an input device 220 for receiving input from user 201. Input device 220 may include, for example, one or more buttons, a keypad, a touch sensitive panel (e.g., a touch pad or a touch screen), and/or a microphone. A single component such as a touch screen may function as both an output device of media output component 215 and input device 220.

Computing device 200 may also include a communication interface 225, which is communicatively couplable to another device 232, for example motor 104, transceiver device 130, programmer computing device 131, system controller 144, or another device. In some implementations, communication interface 225 is configured to enable communication through a short range wireless communication protocol such as near field communication (NFC), Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals). In some implementations, communication interface 225 includes, for example, one or more conductors for transmitting electrical signals and/or power to and/or from another device 232. Additionally, computing device 200 may also include power electronics 230 which may be coupled, for example, to processor 205 and motor 104. In at least some implementations, wireless communication interface 126 and wireless communication interface 132 are examples of communication interface 225 that are configured to transmit and receive data using NFC.

Figure 3:
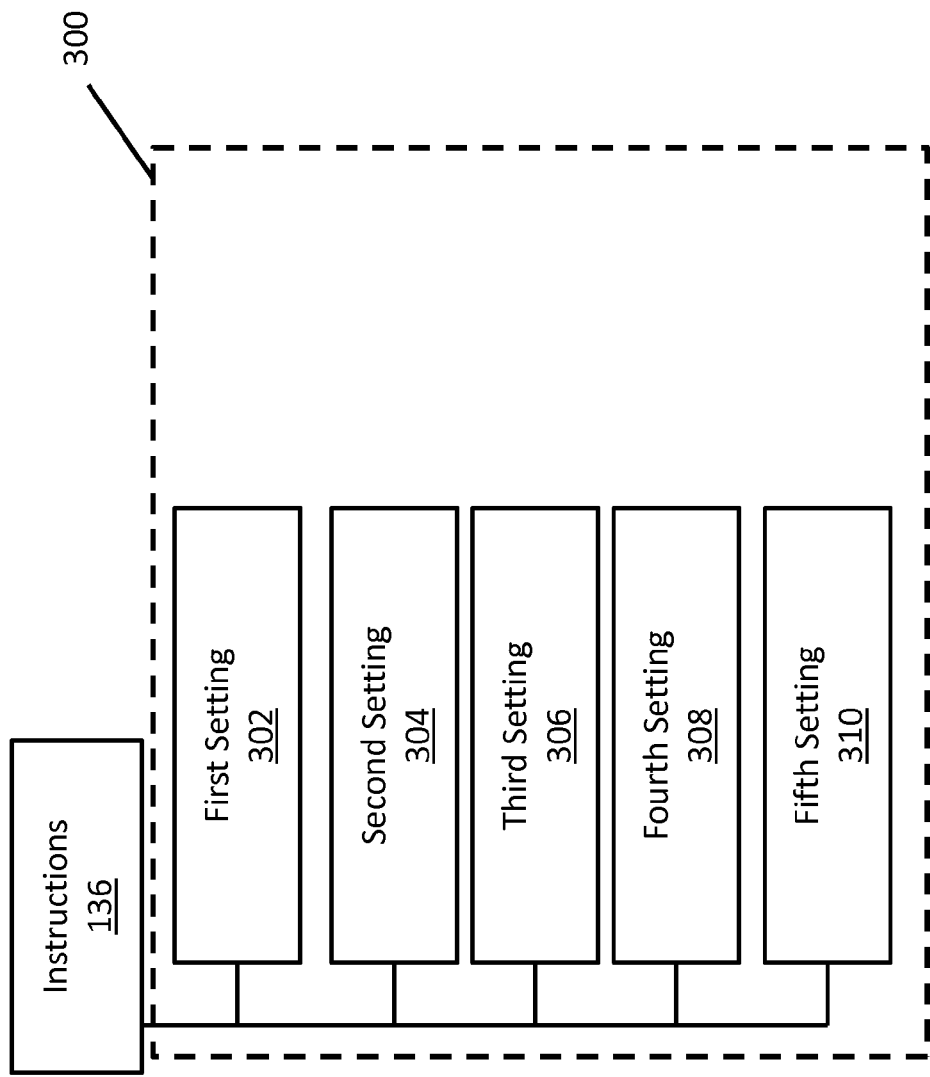
FIG. 3 is a diagram of settings included in instructions transmitted by a transceiver device to the motor controller shown in FIG. 1.

FIG. 3 is a diagram of settings 300 included in instructions 136 transmitted by transceiver device 130 to motor controller 102. More specifically, in at least some implementations, transceiver device 130 transmits instructions 136 wirelessly, for example using NFC, to motor controller 102. In at least some implementations, motor controller 102, and more specifically, wireless communication interface 126, stores settings 300 included in instructions 136 using power 138 transmitted in instruction signal 134, without requiring additional power from an additional source. In other words, the amount of power 138 in instruction signal 134 is at least equal to a threshold amount of power required by motor controller 102 to store settings 300 in memory 128.

Settings 300 include a first setting 302 representing at least one target speed for motor 104, for example a target number of revolutions per minute (RPM). In some implementations, first setting 302 includes a plurality of target speeds, torques, current, voltages, flows, and/or other target values, each associated with a selectable mode of operation of motor 104.

In some implementations, settings 300 include a second setting 304, representing a pulse duration, for example a time period (e.g., number of milliseconds) in which motor controller 102 maintains each pulse 151 at the first predefined voltage. More specifically, in at least some implementations, motor controller 102 is configured to transmit report signal 150 such that each pulse 151 is of a fixed duration (i.e., width), rather than a variable duration (i.e., width). In such implementations, report data 152 is represented by a number of pulses 402 (e.g., a number of pulses per second) included in report signal 150, rather than the duration (i.e., width) of each pulse 151.

In at least some implementations, settings 300 include a third setting 306 representing a number of pulses 151 that motor controller 102 includes in report signal 150 to represent each revolution of motor 104 that motor controller 102 detects in feedback 112 during a predefined time period.

In at least some implementations, settings 300 include a fourth setting 308 that defines a level of filtering that motor controller 102 performs on a measured speed of motor 104 before transmitting the speed in report data 152. More specifically, in at least some implementations, motor controller 102 collects a plurality of measurements of the speed of motor 104, for example a number of revolutions of motor 104 in each of a plurality of contiguous time periods, and averages the measurements. Accordingly, the level of filtering represents the number of measurements that motor controller 102 averages together.

Settings 300 additionally include a fifth setting 310 that indicates a level of responsiveness of motor controller 102 to receiving control signals 146 from system controller 144. More specifically, fifth setting 310 includes a number representing an amount of time, for example a number of milliseconds, that elapses during which motor controller 102 responds to the control signals 146. For example, if control data 148 in control signal 146 includes a target speed, torque, current, voltage, flow, and/or other target value, or a selected mode of operation associated with the target value (e.g., first setting 302), then motor controller 102 determines a difference between a current measured value (e.g., speed, torque, current, voltage, or flow) associated with motor 104 and the target value, and transmits a series of increasing intermediate values (e.g., commands 108) to motor 104 over the course of the response time (e.g., fifth setting 310), such that motor 104 ramps up to the target value specified in control data 148.

Figure 4:
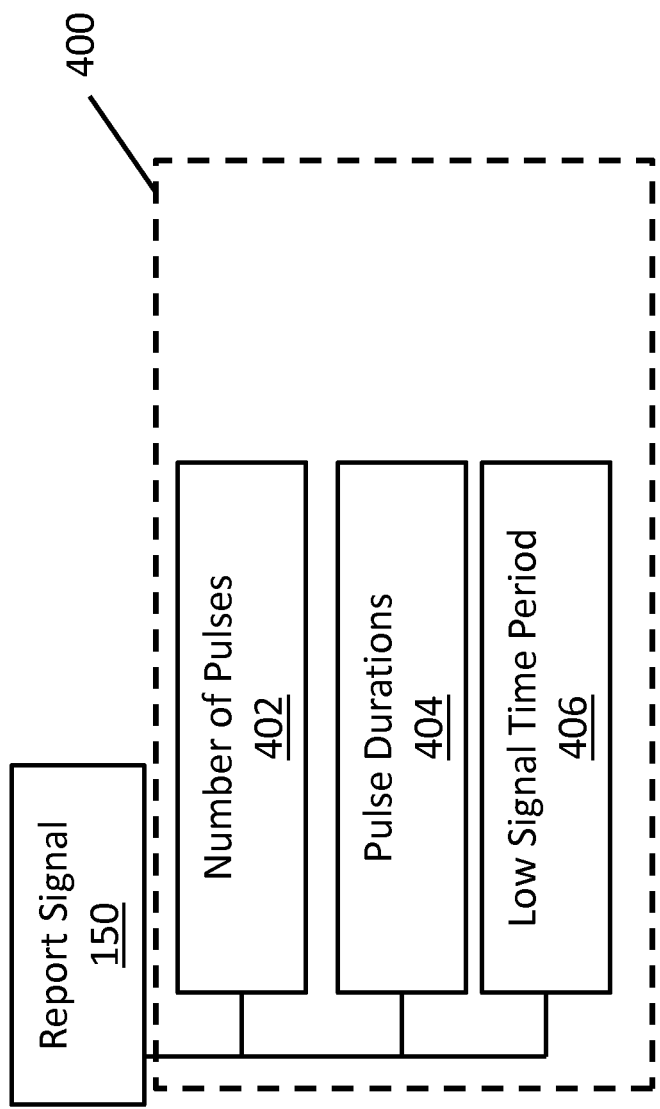
FIG. 4 is a diagram of characteristics of a report signal transmitted by the motor controller shown in FIG. 1.

FIG. 4 is a diagram of characteristics 400 of report signal 150. Characteristics 400 include a number of pulses 402, pulse durations 404 (e.g., time periods during which pulses 151 remain at the first predefined voltage), and a low signal time period 406 (e.g., period of time in which report signal 150 is at the second predefined voltage). Report data 152 is encoded by characteristics 400. For example, number of pulses 402 is representative of the speed of motor 104 reported by motor controller 102. As described above, with reference to third setting 306, motor controller 102 is configurable to transmit a predefined number of pulses 151 for each revolution of motor 104 that occurs during a predefined time period.

Figure 5:
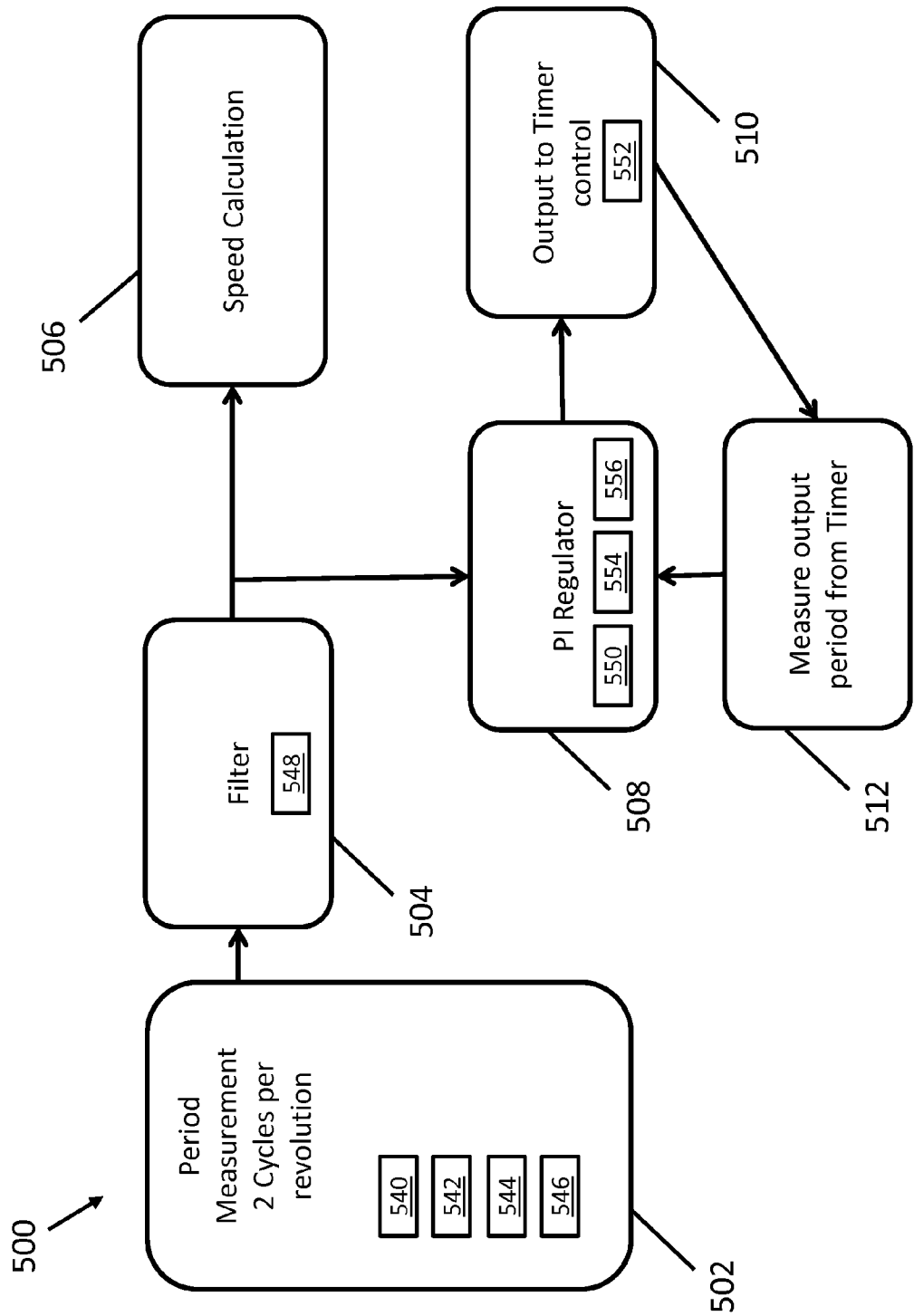
FIG. 5 is a diagram of operations performed by the motor controller for calculating and reporting a speed of the motor shown in FIG. 1.

FIG. 5 is a diagram of operations 500 performed by motor controller 102 for calculating and reporting speed 105 of motor 104. Motor controller 102 repeatedly measures 502 time periods (e.g., time period 109) that elapse for the number of revolutions of 107 motor 104 to reach predefined number 113. As described above, in at least some implementations, motor controller 102 receives feedback 112 from motor 104, in which occurrences of revolutions 107 are indicated. In some implementations, feedback 112 includes indications of cycles 111 and motor controller 102 determines the number of revolutions 107 based on the number of cycles 111. For example, in some implementations, motor controller 102 determines that one revolution 107 occurred for every two cycles 111 indicated in feedback 112. Motor controller 102 generates a plurality of measurements, including, for example a first measurement 540, a second measurement 542, a third measurement 544, and a fourth measurement 546. In other implementations, motor controller 102 measures how many revolutions 107 of motor 104 occurred within predefined time period 115, rather than measuring the time period required for motor 104 to perform predefined number 113 of revolutions 107.

Additionally, motor controller 102 filters 504 the measurements (e.g., first measurement 540, second measurement 542, third measurement 544, and fourth measurement 546) generated by motor controller 102. More specifically, for example, motor controller 102 generates an average measurement 548 by averaging the measurements (e.g., first measurement 540, second measurement 542, third measurement 544, and fourth measurement 546). The number of measurements that motor controller 102 averages together is determined by fourth setting 308, described above.

Additionally, motor controller 102 calculates 506 speed 105 of motor 104. For example, in at least some implementations, motor controller 102 divides the predefined number 113 of revolutions 107 by the time period required for motor 104 to perform the predefined number 113 of revolutions 107. More specifically, motor controller 102 divides predefined number 113 by average measurement 548. In some implementations, motor controller 102 multiplies predefined number 113 by a constant, for example to convert predefined number 113 to a different set of units, prior to dividing by average measurement 548. Additionally, motor controller 102 generates report signal 150 by operating 508 PI regulator 154. More specifically, motor controller 102 generates and transmits 510 timing data 155 to timer controller 156. Initially, timing data 155 is a set of predefined initial values 550 stored by motor controller 102. In at least some implementations, timing data 155 includes low signal time period 406. Based on a reference time period in which report data 152 is transmitted, low signal time period 406 is the portion of the reference time period that is not occupied by pulses 151. The remainder of the reference time period is occupied by evenly-spaced pulses 151 having pulse duration 404.

Timer controller 156 generates report signal 150, representing a reported speed 552, using timing data 155. Motor controller 102 transmits report signal 150 to system controller 144. PI regulator 154 measures 512 reported speed 552 in report signal 150 and determines a difference 554 between reported speed 552 and the measured speed (e.g., speed 105) of motor 104. For example, if reported speed 552 is less than the measured speed (e.g., speed 105), then PI regulator 154 adjusts timing data 155 by a predefined adjustment value 556, such that the low signal period decreases and the number of pulses 151 in the next report signal 150 increases accordingly. Conversely, if reported speed 552 is greater than the measured speed (e.g., speed 105), then PI regulator 154 adjusts timing data 155 such that the low signal period increases and the number of pulses 151 in the next report signal 150 decreases. PI regulator 154 repeatedly performs the above process such that an absolute value of difference 554 decreases over time.

Figure 6:
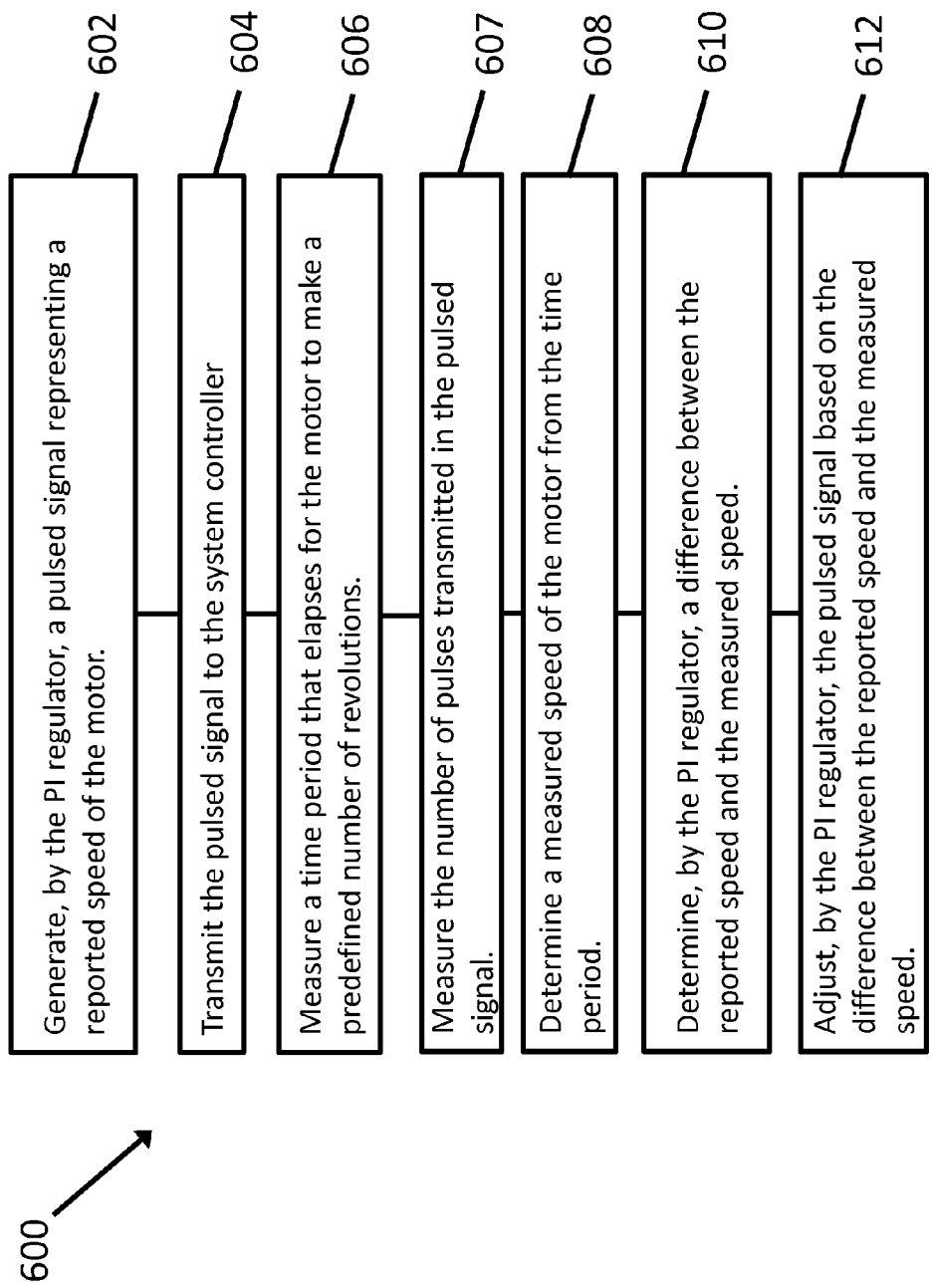
FIG. 6 a flowchart of a process performed by the motor controller for reporting a speed of motor shown in FIG. 1.

FIG. 6 a flowchart of a process 600 performed by motor controller 102 for reporting a speed of motor 104. Initially, motor controller 102 generates 602, using PI regulator 154, a pulsed signal (e.g., report signal 150) representing a reported speed (e.g., reported speed 552) of motor 104. Additionally, motor controller 102 transmits 604 the pulsed signal (e.g., report signal 150) to system controller 144. Additionally, motor controller measures 606 a time period (e.g., time period 109) that elapses for motor 104 to make a predefined number of revolutions 107 (e.g., predefined number 113). Additionally, motor controller 102, and more specifically PI regulator 154, measures 607 a number of pulses (e.g., the number of pulses 151) transmitted in the pulsed signal (e.g., report signal 150). Further, motor controller 102 determines 608 a measured speed (e.g., speed 105) of motor 104 from the time period (e.g., time period 109). Motor controller additionally determines 610, using PI regulator 154, a difference (e.g., difference 554) between the reported speed (e.g., reported speed 552, as represented by the number of pulses 151 in report signal 150) and the measured speed (e.g., speed 105). Additionally, motor controller 102 adjusts, using PI regulator 154, the pulsed signal (e.g., report signal 150) based on the difference (e.g., difference 554) between the reported speed (e.g., reported speed 552) and the measured speed (speed 105).

In some implementations, system controller 144 is a furnace controller and motor controller 102 transmits the pulsed signal (e.g., report signal 150) to furnace controller 144. In some implementations, motor controller 102 adjusts the pulsed signal (e.g., report signal 150) by incrementing or decrementing a number of pulses 151 in the pulsed signal (e.g., report signal 150) by a predefined number (e.g., predefined adjustment value 556) to reduce the difference (e.g., difference 554) between the reported speed (e.g., reported speed 552) and the measured speed (e.g., speed 105). In some implementations, the time period (e.g., time period 109) is a first time period (e.g., first measurement 540), and motor controller 102 additionally measures at least a second time period (e.g., second measurement 542) that elapses for motor 104 to make the predefined number (e.g., predefined number 113) of revolutions 107. Additionally, motor controller 102 determines an average time period (e.g., average measurement 548) by averaging the first time period (e.g., first measurement 540) with at least the second time period (e.g., second measurement 542) and determines the measured speed (e.g., speed 105) of the motor (e.g., motor 104) from the average time period (e.g., average measurement 548). In some implementations, motor controller 102 generates the pulsed signal (e.g., report signal 150) by transmitting, to the timer controller (e.g., timer controller 156), an output period (e.g., timing data 155) representing an amount of time in which the pulsed signal (report signal 150) is to be low (i.e., the second predefined voltage).

In some implementations, motor controller 102 determines the difference (e.g., difference 554) between the reported speed (e.g., reported speed 552) and the measured speed (e.g., speed 105) by measuring 512 an output period representing an amount of time in which the pulsed signal (e.g., report signal 150) transmitted to the system controller (e.g., system controller 144) is low (i.e., the second predefined voltage). In some implementations, motor controller 102 includes a wireless communication interface (e.g., wireless communication interface 126) coupled to a memory (e.g., memory 128). In at least some implementations, motor controller 102 receives an instruction signal (e.g., instruction signal 134) using the wireless communication interface (e.g., wireless communication interface 126), wherein the instruction signal (e.g., instruction signal 134) includes at least one setting (e.g., settings 300). Additionally, motor controller 102 stores the at least one setting (e.g., settings 300) in the memory (e.g., memory 128) using power (e.g., power 138) transmitted in the instruction signal (e.g., instruction signal 134). In some implementations, motor controller 102 receives the instruction signal (e.g., instruction signal 134) and stores the at least one setting (e.g., settings 300) while motor controller 102 is not physically connected to an external power source (not shown). For example, in some implementations, motor controller 102 receives and stores the settings while motor controller 102 is in a shipping container and not physically connected to any power source. In other implementations, motor controller 102 receives and stores the settings while motor controller 102 is installed at a field location (e.g., coupled to load 114).

In some implementations, motor controller 102 stores a value (e.g., first setting 302) defining a speed, torque, current, voltage, flow or other target value associated with a mode of operation of motor 104. In some implementations, motor controller 102 stores a value (e.g., second setting 304) defining a duration of a pulse 151 for the pulsed signal (e.g., report signal 150). In some implementations, motor controller 102 stores a value (e.g., third setting 306) defining a number of pulses 151 to be output in the pulsed signal (e.g., report signal 150) for each revolution 107 of motor 104, or, more generally, for a measured speed (e.g., speed 105) of motor 104. In some implementations, motor controller stores a value (e.g., fourth setting 308) defining a level of filtering (e.g., number of measurements to be averaged together) to be performed on the measured speed (e.g., speed 105). In some implementations, motor controller 102 stores a value (e.g., fifth setting 310) defining a speed of response of motor controller 102 to receiving a speed selection (e.g., control data 148) from the system controller (e.g., system controller 144).

The methods and systems described herein may be implemented using computer programming or engineering techniques including computer software, firmware, hardware or any combination or subset thereof, wherein the technical effect may include at least one of: (a) generating, by a proportional-integral (PI) regulator included in a motor controller, a pulsed signal representing a reported speed of a motor; (b) transmitting the pulsed signal to a system controller; (c) measuring a time period that elapses for the motor to make a predefined number of revolutions; (d) measuring a number of pulses transmitted in the pulsed signal; (e) determining a measured speed of the motor from the time period; (f) determining, by the PI regulator, a difference between the reported speed and the measured speed; and (g) adjusting, by the PI regulator, the pulsed signal based on the difference between the reported speed and the measured speed.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

As compared to known systems and methods for generating a report signal representing a current speed of a motor, the systems and methods described herein enable generation of the report signal more cost efficiently. More specifically, rather than requiring a relatively expensive computing device to perform processor-intensive operations to generate a pulsed report signal representing a measured speed of the motor, the systems and methods described herein enable using a less expensive PI regulator coupled to a timer controller to report the measured speed of the motor. Additionally, the systems described herein enable a motor controller to be configured wirelessly and without requiring that the motor controller be physically coupled to a power source to receive and store configuration settings. Accordingly, a motor controller can be configured while it is still installed in a field location (e.g., inside a furnace) and/or while the motor controller is in a shipping container.

Exemplary embodiments of systems and methods for communicating data with a motor controller are described herein. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller configured to be coupled to a motor and to a system controller, said motor controller comprising a proportional-integral (PI) regulator coupled to a timer controller, said motor controller configured to:
   generate, by the PI regulator, a pulsed signal representing a reported speed of the motor;
   transmit the pulsed signal to the system controller;
   measure a time period that elapses for the motor to make a predefined number of revolutions;
   measure a number of pulses transmitted in the pulsed signal;
   determine a measured speed of the motor from the time period;
   determine, by the PI regulator, a difference between the reported speed and the measured speed;
   adjust, by the PI regulator, the pulsed signal based on the difference between the reported speed and the measured speed; and
   transmit the adjusted pulsed signal to the system controller in accordance with instructions received from the system controller.

2. The motor controller of claim 1, wherein the system controller is a furnace controller and said motor controller is further configured to transmit the pulsed signal to the furnace controller.

3. The motor controller of claim 1, further configured to adjust the pulsed signal by incrementing or decrementing the number of pulses in the pulsed signal by a predefined number to reduce the difference between the reported speed and the measured speed.

4. The motor controller of claim 1, wherein the time period is a first time period, said motor controller further configured to:
   measure at least a second time period that elapses for the motor to make the predefined number of revolutions;
   determine an average time period by averaging the first time period with at least the second time period; and
   determine the measured speed of the motor from the average time period.

5. The motor controller of claim 1, further configured to generate the pulsed signal by transmitting, to the timer controller, an output period representing an amount of time in which the pulsed signal is to be low.

6. The motor controller of claim 1, further configured to determine the difference between the reported speed and the measured speed by measuring an output period representing an amount of time in which the pulsed signal transmitted to the system controller is low.

7. The motor controller of claim 1, further comprising a wireless communication interface coupled to a memory, said motor controller further configured to:
receive an instruction signal using the wireless communication interface, wherein the instruction signal includes at least one setting; and
store the setting in said memory using power transmitted in the instruction signal.

8. The motor controller of claim 7, further configured to receive the instruction signal and store the setting while the motor controller is not physically connected to an external power source.

9. The motor controller of claim 7, further configured to store the setting by storing a value defining a duration of a pulse for the pulsed signal.

10. The motor controller of claim 7, further configured to store the setting by storing a value defining a number of pulses to be output in the pulsed signal for each revolution of the motor.

11. The motor controller of claim 7, further configured to store the setting by storing a value defining a number of pulses to output in the pulsed signal for the measured speed.

12. The motor controller of claim 7, further configured to store the setting by storing a value defining a speed of response of the motor controller to receiving a speed selection from the system controller.

13. The motor controller of claim 7, further configured to store the setting by storing a value defining a level of filtering to be performed on the measured speed.

14. The motor controller of claim 7, further configured to store the setting by storing a target value associated with a mode of operation of the motor.

15. A method for reporting a speed of a motor, said method is implemented by a motor controller coupled to a motor, said method comprising:
generating, by a proportional-integral (PI) regulator included in the motor controller, a pulsed signal representing a reported speed of the motor;
transmitting the pulsed signal to a system controller;
measuring a time period that elapses for the motor to make a predefined number of revolutions;
measuring a number of pulses transmitted in the pulsed signal;
determining a measured speed of the motor from the time period;
determining, by the PI regulator, a difference between the reported speed and the measured speed;
adjusting, by the PI regulator, the pulsed signal based on the difference between the reported speed and the measured speed; and
transmitting the adjusted pulsed signal to the system controller in accordance with instructions received from the system controller.

16. The method of claim 15, wherein transmitting the pulsed signal further comprises transmitting the pulsed signal to a furnace controller.

17. The method of claim 15, wherein adjusting the pulsed signal further comprises incrementing or decrementing the number of pulses in the pulsed signal by a predefined number to reduce the difference between the reported speed and the measured speed.

18. The method of claim 15, wherein generating the pulsed signal further comprises transmitting, to a timer controller, an output period representing an amount of time in which the pulsed signal is to be low.

19. The method of claim 15, wherein the motor controller includes a wireless communication interface coupled to a memory, said method further comprising:
receiving an instruction signal using the wireless communication interface, wherein the instruction signal includes at least one setting; and
storing the setting in the memory using power transmitted in the instruction signal.

20. The method of claim 15, further comprising receiving the instruction signal and storing the setting while the motor controller is not physically connected to an external power source.

* * * * *